United States Patent Office 3,478,671
Patented Nov. 18, 1969

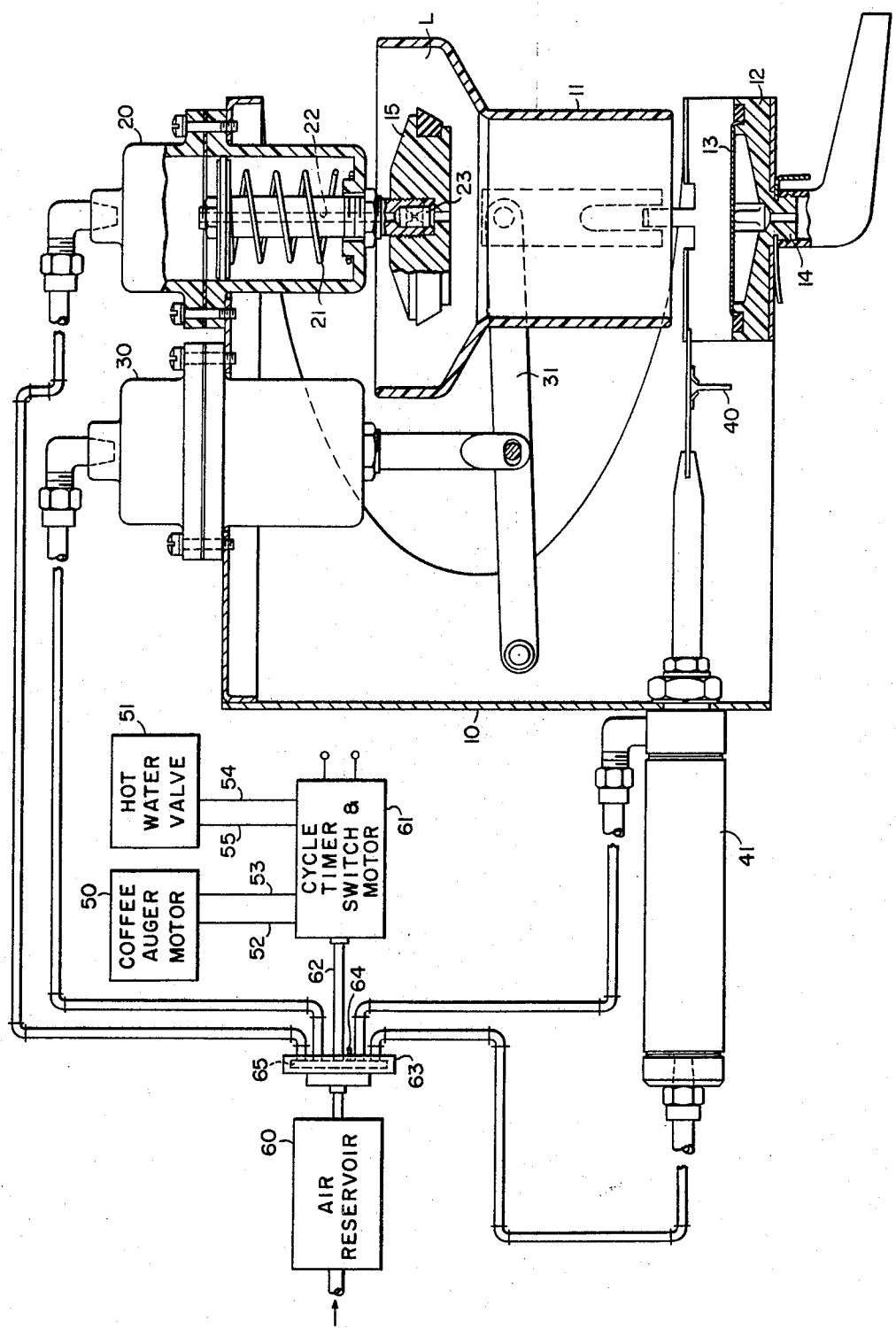

3,478,671
TIMING ARRANGEMENT FOR AN AIR OPERATED COFFEE BREWER
Norman L. Fuqua and John J. Ambrose, Wilbraham, Mass., assignors to Westinghouse Electric Corporation, Pittsburgh, Pa., a corporation of Pennsylvania
Filed June 28, 1968, Ser. No. 741,029
Int. Cl. A47j 31/32
U.S. Cl. 99—283                                           2 Claims

ABSTRACT OF THE DISCLOSURE

In an air operated coffee brewer having a movable brew cylinder, stopper and screen wiper together with air cylinders for moving them in timed relation during a brew cycle; the brewer also having electrically operated devices for feeding ground coffee and water to the brew cylinder during the cycle; the combination of a timing arrangement including a rotatable cycle switch and rotatable air valve driven by a single electric motor for controlling both said air operated and said electrically operated devices in timed relation to each other.

Cross-references to related patent applications

Air operated coffee brewers with which the timing arrangement of the invention may be used are described in the copending U.S. patent applications 741,027 and 741,028 assigned to the same assignee as the present application.

Background of the invention

Air operated coffee brewers of the type disclosed by the above-mentioned copending applications, have a movable stopper and an air piston for moving the stopper into sealing relation with the upper open end of a brew cylinder whose lower end may be connected to a filter screen and brewed coffee outlet. The brew cylinder is normally positioned above the filter screen and is movable thereto by a second air piston. In order to extract the brewed coffee through the filter screen in a given period of time, known as the brewing time during the brew cycle, air under pressure is introduced into the brew cylinder while the stopper is closing the brew cylinder and the brew cylinder is engaging the filter screen during the brew cycle. Towards the end of the brew cycle, the stopper and the brew cylinder are again moved back to their normal raised positions and a wiper blade is reciprocated by a third air cylinder across the filter screen to remove spent coffee grounds therefrom. The cycle of operation is to first lower the brew cylinder onto the screen, then introduce coffee and hot water by electrically operated instrumentalities such as an electric motor driven coffee auger and an electric hot water valve, move the stopper down into sealing relation with the brew cylinder and force air into the brew cylinder to extract brewed coffee and water through the filter screen, raise the brew cylinder and stopper back to their normal positions, and lastly operate the wiper blade to be reciprocated across the filter screen in a manner to remove the spent coffee grounds therefrom.

The coffee brewers embodying the above-mentioned devices as disclosed in the above mentioned copending patent applications are provided with a cycle switch driven by an electric motor to control electrically operated air valves to feed air under pressure from the air reservoir to the various air cylinders in the proper time sequences during the brewing cycle. The same cycle timer switch also functions to control the electrically operated coffee and water feeding devices to the brew cylinder. Inasmuch as electrically operated valves and controlling switch contacts therefor on the cycle switch are relatively expensive, it may be desirable in some instances to simplify the arrangement in a manner to avoid the requirements of use of such electrically operated air valves and switches.

Prior art

Applicants are unaware of any prior art arrangements of an air operated coffee brewer having the specified timing arrangement of this invention.

Summary

According to the invention, the air operated coffee brewer having a movable brew cylinder with air cylinder therefor, a movable stopper with air cylinder therefor, and a movable screen wiper with air cylinder therefor, is provided with a timing arrangement comprising a rotatable cycle switch and motor and a rotatable air valve also connected to the cycle switch motor to be rotated thereby. The air valve is connected to an air reservoir and to the respective air operating cylinders for the brew cylinder, stopper, and wiper blade, in a manner to pressurize said devices and move their associated components of the brewer in the desired timed relation during the brew cycle. The air operated coffee brewer also has at least two electrical instrumentalities including an electrically operated coffee auger for augering coffee from a storage hopper into the brew cylinder and an electrically operated hot water valve to be operated at the proper time in the brew cycle to insert the coffee and hot water to be brewed into the brew cylinder. A further feature of the invention therefor is to provide additional cycle switch contacts operated by the same electric motor and shaft that operates the rotatable air valve, these switch contacts being connected to the electrical instrumentalities including the electrically operated coffee auger and hot water valve to control their operation in the desired time relation to the air operated instrumentalities of the coffee brewer.

Further objects, features and the attendant advantages of the invention will be apparent with reference to the following specification and drawing.

Brief description of the drawing

The sole figure of the drawing is a side elevational view partly in section of an air operated coffee brewer embodying the timing arrangement including the rotatable air valve and the rotatable cycle timer switch and motor of the invention.

Description of the preferred embodiment of the invention

Reference may be made to the aforementioned copending patent applications Ser. No. 741,027 and Ser. No. 741,028 for a more complete detailed description of air operated coffee brewers of the type for which the cycle timing arrangement of the present invention is particularly suitable. In order to simplify the description and drawing of the present invention, only a brief description of the air operated coffee brewer as required for an understanding of this invention will be made herein.

Referring to the drawing, a sheet metal frame 10 is shown to support a movable brew cylinder 11 normally positioned to be spaced above the brewing platform 12 upon whose upper surface is a filter screen 13 overlying the brewed coffee outlet 14. A stopper for the upper open end of the brew cylinder 11 is normally positioned as shown to be spaced above the upper open end of the cylinder 11 and is movable downward into sealing relation therewith when air under pressure is valved into the air cylinder 20. Very similarly, the air cylinder 30 is connected to the arm 31 and the movable brew cylinder 11 in a manner to lower the brew cylinder 11 onto the platform 12 in sealing relation when air is supplied to the air cylinder 30. Near the end of each brew cycle, a wiper blade 40 is reciprocated across the filter screen 13 to remove spent coffee grounds therefrom, and in order to reciprocate the wiper blade 40 at that time in the brew cycle a double-acting air cylinder 41 is provided. In order to introduce ground coffee and hot water into the brew cylinder 11 while it is seated on the platform 12 and before the stopper 15 is lowered into sealing relation with the cylinder 11, an electrically operated coffee auger 50 and an electrically operated hot water valve 51 are operated to discharge such ingredients through a spout (not shown) onto the enlarged lip portion L of the coffee brew cylinder 11.

An air reservoir 60 is supplied with air under pressure from an air compressor (not shown). An electric motor driven cycle timer switch 61 is provided with a rotatable switch shaft 62 and certain electrical switches of the cycle timer 61 are connected by lines 52, 53 to the electrically operated coffee auger motor 50 and by lines 54, 55 to the electrically operated hot water valve 51.

A rotatable air valve 63 is connected to the shaft 62 so that air from the reservoir 60 is valved to the respective air cylinders 20, 30 and 41 at the proper intervals and for the proper time durations as the cycle motor 61 is rotated during the brew cycle. The rotatable air valve 62 may be of any suitable form known to those skilled in the art and is arranged to have a vent pipe 64 connected to the atmosphere for venting the air pressures from within the cylinders 20, 30 and 41 at the appropriate times. Thus, as the cycle timer shaft 62 rotates for one revolution during each brew cycle, air under pressure is first admitted to and maintained in the air cylinder 30 for lowering the brew cylinder 11 onto the platform 12. Thereafter, air under pressure is valved to and maintained in the air cylinder 20 for lowering the stopper 15 into sealing relation with the brew cylinder 11. After the coffee has been brewed at a later time in the brew cycle, air within both cylinders 20 and 30 is vented to atmosphere through the vent pipe 63, allowing the return springs in the air cylinder such as the return spring 21 for the cylinder 20, to again move the brew cylinder 11 and stopper 15 back to their normal raised positions. Just before the end of the brew cycle, air is valved to first one end and then the other end of the double-acting air cylinder 41 in a manner to reciprocate the wiper blade 40 across the filter screen surface 13. As previously mentioned, the rotation of the cycle timer shaft 62 is also effective to operate certain electrical switch contacts for operating the coffee auger motor 50 and the hot water valve 51 at a time between the operation of the air cylinder 30 and the air cylinder 20, while the brew cylinder 11 is lowered into sealing relation with the platform 12 and before the stopper 15 is lowered into sealing relation with the brew cylinder 11.

Although the details of a specific form of rotatable air valve 63 have not been described and shown in the drawings and it should be understood that various well known types of air operated valves may be used, an example of a suitable rotatable air valve is one having a rotatable valve disc such as shown at 65 that is pressed against a stationary valve seat by the pressure of air coming from the air reservoir 60. Suitable ports (not shown) are provided through the rotatable valve disc 65 and in the stationary valve seat in a manner well known to those skilled in the art to predetermine the angular positions of the rotatable valve seat 65 corresponding to the timing for valving of air from the air reservoir 60 to the respective valve outlets connected to the respective air cylinders 20, 30 and 41 as the disc 65 is rotated.

Thus far no description has been made of the arrangement for pressurizing the interior of the brew cylinder 11 during the brew cycle in order to extract the brewed coffee through the filter screen 13. Various arrangements may be used for pressurizing the interior of the brew cylinder and one such arrangement is described and claimed in detail in the aforementioned copending patent application Ser. No. 741,027, This pressurizing arrangement is also shown by FIGURE 1 of the drawing of the subject application and includes a bore 22 and restriction 23 for bleeding air from within the air cylinder 20 into the brew cylinder 11 while the air cylinder 20 is pressurized by the rotatable control valve 63. If it is desired to provide a separate pressurizing arrangement, it is only necessary to provide additional ports in the valve 63 and the associated piping to the brew cylinder with a suitable pressure control arrangement such as a restriction or the like.

Various modifications will occur to those skilled in the art.

We claim as our invention:

1. A pressure operated coffee brewer comprising, a frame, a platform mounted on said frame and having a filter screen overlying a brewed coffee discharge conduit, a brew cylinder open at both ends movably mounted on said frame to be normally positioned with its lower end spaced above said platform and movable downward into sealing relation to the upper surface of said platform, a stopper movably mounted on said frame to be normally spaced above the upper opening of said cylinder and movable downward in sealing relation to the upper opening of said brew cylinder while the brew cylinder is positioned in sealing relation to said platform, wiper means movably mounted on said frame to be reciprocated in wiping relation over said filter surface while said brew cylinder is in its normal position, an air reservoir, first air cylinder means to move said brew cylinder to and from said platform, second air cylinder means to move said stopper to and from said brew cylinder, third air cylinder means to reciprocate said wiper, and cycle timing means to control the operation of all of said first through third means in sequence during each brewing cycle comprising a rotatable cycle switch motor, and a rotatable air valve connected to said motor to be rotated thereby, said air valve connecting said reservoir to said first through third means in predetermined time sequences as said motor is rotated during each brew cycle, whereby said first means moves said brew cylinders to the position with its lower end in sealing relation to said platform for introduction of coffee and water into the brew cylinder, said second means then moves said stopper into sealing relation with the upper end of said brew cylinder for subsequent pressurization of the interior of said brew cylinder to force brewed coffee through said filter, said first and second means are then operated to move said brew cylinder and stopper back to their normal positions, and said third means is then operated to reciprocate said wiper over said filter screen to remove coffee grounds from the screen at the end of the brew cycle.

2. The invention of claim 1 in which at least two electrical switches are connected to be operated by said motor as said motor is rotated during each brew cycle, one of said switches being connected to be operable to control an electrical instrumentality for adding coffee to said brew cylinder, the other of said switches being connected to be operable to control an electrical instrumentality for adding water to said brew cylinder, both switches being operable in timed relation to the rotation of said air valve so that coffee and hot water are introduced into said brew cylinder while said first means is operated to move said brew cylinder to said platform and before said second means is operated to move said stopper to said brew cylinder.

References Cited

UNITED STATES PATENTS

| | | | |
|---|---|---|---|
| 2,827,845 | 3/1958 | Richeson | 99—289 X |
| 2,887,038 | 5/1959 | Rosander | 99—307 |
| 2,899,885 | 8/1959 | Thompson | 99—289 |
| 3,122,988 | 3/1964 | Rota | 99—302 |
| 3,369,478 | 2/1968 | Black | 99—302 X |
| 3,426,670 | 2/1969 | Wittern | 99—283 X |

ROBERT W. JENKINS, Primary Examiner

U.S. Cl. X.R.

99—302